US00RE50952E

(19) United States
(12) Reissued Patent
Murakowski

(10) Patent Number: US RE50,952 E
(45) Date of Reissued Patent: *Jul. 14, 2026

(54) BEAM STEERING ANTENNA TRANSMITTER, MULTI-USER ANTENNA MIMO TRANSMITTER AND RELATED METHODS OF COMMUNICATION

(71) Applicant: Phase Sensitive Innovations, Inc., Newark, DE (US)

(72) Inventor: Janusz Murakowski, Bear, DE (US)

(73) Assignee: Phase Sensitive Innovations, Inc., Newark, DE (US)

( * ) Notice: This patent is subject to a terminal disclaimer.

(21) Appl. No.: 18/122,649

(22) Filed: Mar. 16, 2023

Related U.S. Patent Documents

Reissue of:
(64) Patent No.: 10,950,938
Issued: Mar. 16, 2021
Appl. No.: 16/593,115
Filed: Oct. 4, 2019

U.S. Applications:
(63) Continuation of application No. 15/410,761, filed on Jan. 19, 2017, now Pat. No. 10,439,282.
(Continued)

(51) Int. Cl.
*H01Q 3/26* (2006.01)
*H01Q 5/22* (2015.01)
(Continued)

(52) U.S. Cl.
CPC ..... *H01Q 3/2676* (2013.01); *H01Q 5/22* (2015.01); *H01Q 21/22* (2013.01); *H01Q 21/24* (2013.01)

(58) Field of Classification Search
CPC ..... H01Q 3/2676; H01Q 5/22; H01Q 21/22; H01Q 21/24
See application file for complete search history.

(56) References Cited

U.S. PATENT DOCUMENTS 5,274,381 A 12/1993 Riza
5,379,309 A 1/1995 Logan, Jr.
(Continued)

FOREIGN PATENT DOCUMENTS

EP 2363729 A1 9/2011
EP 2363729 B1 12/2015

OTHER PUBLICATIONS

Akiyama et al., "Two-Dimensional Optical Signal-Processing Beamformer Using Multilayer Polymeric Optical Waveguide Arrays", IEEE Transactions on Microwave Theory and Techniques, vol. 49, No. 10, Oct. 2001, pp. 2055-2061.
(Continued)

*Primary Examiner* — Mark Sager
(74) *Attorney, Agent, or Firm* — Muir Patent Law, PLLC

(57) ABSTRACT

An transmitter to be used in wireless multi-user MIMO has been described above. The system combines the virtues of digital, analog and optical processing to arrive at a solution for scalable, non-blocking, simultaneous transmission to multiple UE-s. The system architecture is independent of the RF carrier frequency, and different frequency bands can be accessed easily and rapidly by tuning the optical source (TOPS). The data channels are established in the digital domain and the RF beam-forming accuracy is only limited by the available resolution of DAC, which can be as high as 16 bits for 2.8 GSPS in off-the-shelf components.

18 Claims, 11 Drawing Sheets

Related U.S. Application Data

(60) Provisional application No. 62/280,673, filed on Jan. 19, 2016.

(51) Int. Cl.
*H01Q 21/22* (2006.01)
*H01Q 21/24* (2006.01)

(56) References Cited

U.S. PATENT DOCUMENTS 5,977,911 A 11/1999 Green et al.
6,020,850 A 2/2000 Ji et al.
6,204,947 B1 3/2001 Page
6,320,539 B1 11/2001 Matthews et al.
6,337,660 B1 1/2002 Esman et al.
6,891,149 B1 5/2005 Lewis et al.
7,084,811 B1 8/2006 Yap
7,174,100 B1 2/2007 Wachsman
7,408,507 B1 8/2008 Paek et al.
7,609,971 B1 10/2009 Zhou
8,848,752 B2 9/2014 Prather et al.
9,250,496 B1 2/2016 Thaniyavarn
9,525,489 B2 12/2016 Schuetz et al.
9,544,510 B2 1/2017 Murakowski et al.
9,614,280 B2 4/2017 Shi et al.
10,009,098 B2 6/2018 Murakowski et al.
10,312,999 B2 6/2019 Neuman
10,313,012 B2 6/2019 Murakowski et al.
10,439,282 B2 * 10/2019 Murakowski
10,627,517 B2 4/2020 Yaacobi et al.
10,965,100 B2 3/2021 Prather
11,005,178 B2 5/2021 Murakowski
11,152,700 B2 10/2021 Shi et al.
11,233,371 B2 1/2022 Popovic et al.
2002/0057218 A1 * 5/2002 Smith ..... H04B 14/008 342/365
2004/0208642 A1 10/2004 Chen et al.
2005/0057431 A1 3/2005 Brown
2005/0213444 A1 9/2005 Murakami et al.
2006/0065856 A1 3/2006 Diaz et al.
2007/0041735 A1 2/2007 Darcie et al.
2007/0206958 A1 9/2007 Chen et al.
2008/0279564 A1 11/2008 Han et al.
2009/0027268 A1 1/2009 Coward
2009/0168367 A1 7/2009 Fujii
2010/0008588 A1 * 1/2010 Feldkhun ..... G01B 11/2527 382/206
2010/0231453 A1 9/2010 Shinkai
2010/0246329 A1 9/2010 Murray et al.
2011/0170870 A1 7/2011 Boffi et al.
2012/0019426 A1 1/2012 Galluppi
2013/0169483 A1 7/2013 Vidal Drummond et al.
2013/0301664 A1 11/2013 Prather et al.
2014/0185053 A1 7/2014 Lin et al.
2014/0231627 A1 8/2014 Wakatsuki et al.
2014/0255039 A1 9/2014 Prather et al.
2014/0270783 A1 9/2014 Prather et al.
2014/0286648 A1 9/2014 Buelow
2015/0003565 A1 1/2015 George et al.
2015/0139253 A1 5/2015 Murakowski et al.
2015/0303986 A1 10/2015 Shi et al.
2016/0054431 A1 2/2016 Zou et al.
2016/0268697 A1 * 9/2016 Zhang ..... H01Q 21/24
2017/0041068 A1 2/2017 Murakowski et al.
2017/0098917 A1 4/2017 Popovic et al.
2017/0207531 A1 7/2017 Murakowski et al.
2017/0310006 A1 10/2017 Vidal et al.
2018/0198608 A1 7/2018 Nordholt et al.
2019/0020109 A1 1/2019 Puleri et al.
2019/0157757 A1 5/2019 Murakowski
2019/0319356 A1 10/2019 Shi et al.
2020/0007261 A1 1/2020 Zou et al.

OTHER PUBLICATIONS

Blanchard et al.: "Coherent Optical Beam Forming with Passive Millimeter-Wave Arrays", Journal of Lightwave Technology, IEEE Service Center, New York, NY, US, vol. 17, No. 3, Mar. 1, 1999 Mar. 1, 1999), XP011029361, ISSN: 0733-8724.
Schneider et al; Optical Generation of Narrow-line RF by Injection Locking of Modulated DFB Lasers; 2011; IEEE; pp. 1-2. (Year: 2011).
Khan et al., "Carrier generation using a dual-frequency distributed feedback waveguide laser for phased array antenna", Journal of the European Optical Society—Rapid Publications 13,30; pp. 1-16. (Year: 2017).
Koepf, "Optical Processor For Phased-Array Antenna Beam Formation", Proc. Spie 0477, Optical Technology for Microwave Applications I, (Nov. 1, 1987); doi: 10.1117/12.942616, pp. 75-81.
Ogawa et al., "Two-Dimensional Multiple Beam Forming Using Slab-Waveguide—Implemented Photonic Beam Forming Network", pp. 197-200, International Topical Meeting on Microwave Photonics. MWP '96 Technical Digest. Satellite Workshop (1996).
Overmiller et al, "Ultrabroadband Phased-array Radio Frequency (RF) Receivers based on optical techniques." Terahertz, RF, Millimeter, and Submillimeter-Wave Technology and Application VII, Proc. Of SPIE vol. 8985, 89850U 2014.
Schneider et al., "Radiofrequency signal-generation system with over seven octaves of continuous tuning," Nature Photonics, published online Jan. 20, 2013 (www.nature.com/naturephatanics) pp. 1-5.
Shibata et al., "Spatial Optical Beam-Forming Network for Receiving-Mode Multibeam Array Antenna-Proposal and Experiment", IEEE Transactions on Microwave Theory and Techniques, vol. 50, No. 5, May 2002, pp. 1425-1430.
Shimizu et al., "Photodiode-integrated microstrip antenna array for subterahertz radiation," in IEEE Photonics Technology Letters, vol. 18, No. 6, p. 743•745, Mar. 15, 2006 (Mar. 15, 2006) [retrieved online Jun. 7, 2017 URL: http://ieeexplore.ieee.org/stamp/stamp.jsp?tp=&arnumber=1599428&isnumber=33633].
Zhi et al., "High-power high-linearity flip-chip bonded modified uni-traveling carrier photodiode," vol. 19, No. 26, Optics Express, Nov. 18, 2011.
Zhu et al; Optical beam steering by using tunable, narrow linewidth butt-coupled hybrid lasers in a silicon nitride photonics platform, Mar. 2020; Photonics Research vol. 8, No. 3; pp. 1-6. (Year: 2020).
Kejia Li et al., "High-Power Photodiode Integrated With Coplanar Patch Antenna for 60-GHz Applications," IEEE Photonics Technology Letters, vol. 27, No. 6, pp. 650-653, Mar. 15, 2015.
International Search Report and Written Opinion dated Jul. 14, 2017 for International Application PCT/US16/47921.

* cited by examiner

BEAM STEERING ANTENNA TRANSMITTER, MULTI-USER ANTENNA MIMO TRANSMITTER AND RELATED METHODS OF COMMUNICATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

This Application is Continuation of U.S. application Ser. No. 15/410,761 filed Jan. 19, 2017, which is a non-provisional Application of U.S. Provisional Application No. 62/280,673 filed Jan. 19, 2016, the entire contents of each of these applications being incorporated by reference.

FIELD OF TECHNOLOGY

The subject matter described herein relates to antenna array formed to transmit information via a radio-frequency beam focused on a selected location. Multiple communication channels may be transmitted simultaneously to different locations. The transmitter may be formed by an array of optically fed antennas.

BACKGROUND

Conformal, low profile, and wideband phased arrays have received increasing attention due to their potential to provide multiple functionalities over several octaves of frequency, using shared common apertures for various applications, such as radar and communications.

SUMMARY

In the disclosed optically-fed transmitting phased-array architecture, transmitting signals are converted between the electrical domain and the optical domain by using electro-optic (EO) modulators and photodiodes. RF signals generated from a relatively low frequency source are up-converted into the multiple sidebands of an optical carrier signal. This modulated optical signal can be remotely imparted to photodiodes via optical fibers. Desired RF signals may be recovered by photo-mixing at the photodiodes whose wired RF outputs are and then transmitted to radiating elements of the antennas.

The antenna array may generate a physical RF beam that transmits an RF signal that is focused on one or more selectable locations. Multiple RF beams may be simultaneously generated, each RF beam being capable of being directed to focus on a unique location or set of locations.

BRIEF DESCRIPTION OF THE DRAWINGS

The accompanying drawings are included to provide a further understanding of exemplary device, system and method embodiments of the invention. In the drawings.

DETAILED DESCRIPTION

Figure 1:
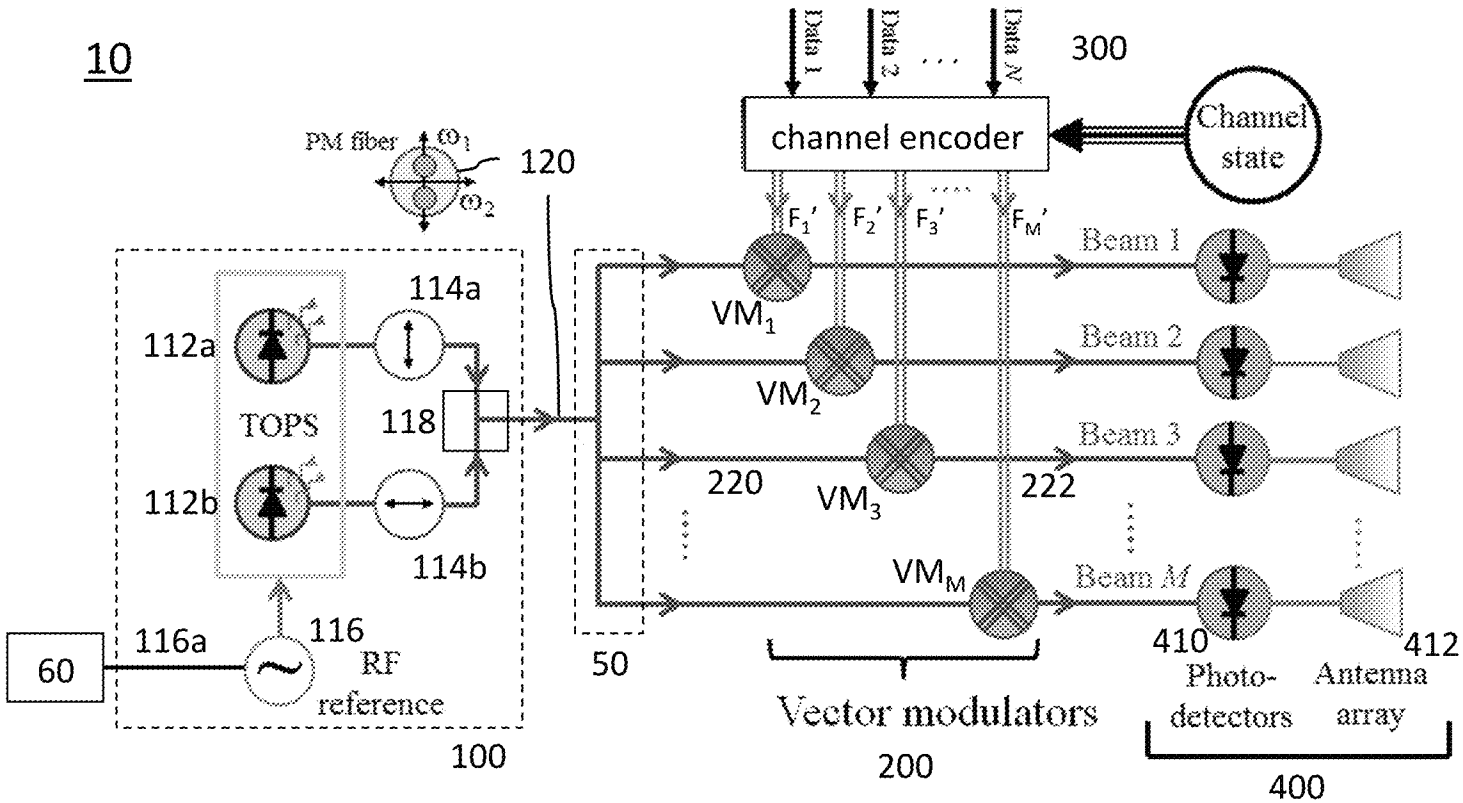
FIG. 1 illustrates one example embodiment of an antenna transmitter.

The present disclosure now will be described more fully hereinafter with reference to the accompanying drawings, in which various exemplary implementations are shown. The invention may, however, be embodied in many different forms and should not be construed as limited to the exemplary implementations set forth herein. These example exemplary implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of layers and regions may be exaggerated for clarity. Like numbers refer to like elements throughout. Reference numeral use of lowercase suffix “m” or “n” in this application refers generically to any one of M or N similar elements (although, similar generic references may also avoid use of a “m” or “n” suffix). Though the different figures show variations of exemplary implementations, these figures are not necessarily intended to be mutually exclusive from each other. Rather, as will be seen from the context of the detailed description below, certain features depicted and described in different figures can be combined with other features from other figures to result in various exemplary implementations, when taking the figures and their description as a whole into consideration.

The terminology used herein is for the purpose of describing particular exemplary implementations only and is not intended to be limiting of the invention. As used herein, the singular forms “a”, “an” and “the” are intended to include the plural forms as well, unless the context clearly indicates otherwise. As used herein, the term “and/or” includes any and all combinations of one or more of the associated listed items and may be abbreviated as “/”.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present. Other words used to describe the relationship between elements should be interpreted in a like fashion (e.g., "between" versus "directly between," "adjacent" versus "directly adjacent," etc.).

Terms such as "about" or "approximately" or "on the order of" may reflect amounts, sizes, orientations, or layouts that vary only in a small relative manner, and/or in a way that does not significantly alter the operation, functionality, or structure of certain elements.

As used herein, items described as being "electrically connected" are configured such that an electrical signal can be passed from one item to the other. Therefore, an electrically conductive component (e.g., a wire, pad, internal electrical line, etc.) may be physically connected to but not electrically connected to an electrically insulative component (e.g., a polyimide layer of a printed circuit board, an electrically insulative adhesive connecting two devices, an electrically insulative underfill or mold layer, etc.). Moreover, items that are "directly electrically connected," to each other may be electrically connected through one or more connected conductors, such as, for example, wires, pads, internal electrical lines, through vias, etc. As such, directly electrically connected components do not include components electrically connected through active elements, such as transistors or diodes. Directly electrically connected elements may be directly physically connected and directly electrically connected.

FIG. 1 illustrates one example embodiment of an antenna transmitter 10. The RF carrier frequency may be generated optically using a tunable optical paired source (TOPS) 100 where a pair of lasers 112a, 112b each emit a light beam 114a, 114b, where the wavelengths (and frequencies) of the light beams 114a, 114b are offset. The lasers are correlated by injection locking, and the wavelength offset between the light beams 114a, 114b emitted by the lasers 112a, 112b is determined by an RF reference source 116 of the TOPS 100. The RF reference source 116 may be a voltage controlled oscillator so that the RF carrier frequency generated by the RF reference source 116 is responsive to a voltage 116a that may be adjustable in real time (or for different uses of the antenna transmitter 10) to adjust the corresponding frequency band of the antenna transmitter 10. The voltage 116a input to control the RF carrier frequency generated by the RF reference source, may be selectable by a user of the antenna transmitter 10, such as by being generated responsive to a programmable controller or other computer configured by software, switches, codes provided by a programmable fuse bank, etc. (such control structure generically represented by 60 in FIG. 1). Further details of the TOPS operation and structure are disclosed in provisional Application No. 62/289,673 via its detailed description including Schneider et al. "Radiofrequency signal-generation system with over seven octaves of continuous tuning," Nat. Photonics, vol. 7, no. 2, pp. 118-122, February 2013. The contents of provisional Application No. 62/289,673/Schneider et al. are incorporated by reference in their entirety for the teachings of details of structure and operation of TOPS. The optical beams 114a, 114b from the two lasers of TOPS are combined by a conventional optical combiner 118 and input into a single polarization-maintaining (PM) optical fiber 120, each optical beam 114a, 114b being coupled to a different one of the two modes of the PM fiber 120. The distinct modes of a PM fiber 120 differ in polarization are referred to as a 'slow axis' and 'fast axis.' The optical beams 114a and 114b are polarized at angles orthogonal to each other and thus may initially travel independently through out the PM optical fiber 120 without interference.

From this point, the two optical beams 114a, 114b differing in wavelength travel together and, as a result, the environmental effects such as acoustics, vibration or temperature variation on the relative phase between the beams may be minimized. The RF reference oscillator 116 of the TOPS 100 not only determines the difference in wavelength of the two optical beams 114a, 114b, but acts as a reference for the phase and frequency of a beat frequency resulting from a combined optical beam (to be described further below).

The fiber (and the optical beams 114a, 114b in PM optical fiber 120) is split M ways by a conventional beam splitter 50. Each of M branches output by the beam splitter 50 is coupled to a corresponding electro-optic vector modulator $VM_1, VM_2, \ldots, VM_M$ via an optical fiber 220. The beam splitter 50 may be implemented with a prism, partially reflective mirror, a planar light wave circuit (PLC), a lithium niobate chip that incorporates several modulators, etc., which may allow for omitting optical fiber 220 from the transmitter 10. The input $F'_m$ to each $VM_m$ is provided by the channel encoder 300 and comprises a pair of analog signals Fr and Fp provided on separate lines to the vector modulator $VM_m$. The pair of signals that carry Fr and Fp respectively carry the desired amplitude and phase of the RF to be output by a corresponding antenna 44m (to which a respective vector modulator $VM_m$ is connected). In the vector modulator $VM_m$, the phase information Fp in encoded into the relative phase offset between the two optical beams 114a, 114b, and the amplitude information Fr is encoded into the amplitude of one or both of the optical beams 114a, 114b.

In addition, the vector modulator $VM_m$ rotates the polarization of one or more of the optical beams 114a, 114b so that their polarization directions of the optical beams 114a, 114b are aligned (discussed further below). As such, the optical beams 114a, 114b may interfere with each other. The output of each vector modulator $VM_m$ is a linearly polarized light containing two spectral lines modulated in relative phase and in amplitude according to the electrical inputs $F'_m$ to the corresponding vector modulator $VM_m$.

The output of each vector modulator $VM_m$ is conveyed by an optical fiber 222m to a corresponding photo-detector 410m coupled directly, or through an RF amplifier, to an antenna 412m of the transmitter antenna array 400. As a result, each of the antennas $\mathbf{412}_m$ in the array 400 transmits an RF electromagnetic wave at a frequency determined by or as a function of the wavelength offset in TOPS (the difference in wavelengths between the optical beams 114a, 114b as determined by the TOPS RF reference 116), and modulated in phase and amplitude determined the pair of electrical inputs to the corresponding vector modulator $VM_m$ provided by the channel-encoder 300 in FIG. 1. The channel-encoder 300 in FIG. 1 converts N digital data streams Data 1, Data 2, . . . Data N into M analog vector signals that are fed (as $F'_m$=Fr, Fp) into the electrical inputs of the respective M vector modulators $VM_m$. In this example, each of the digital data streams Data 1, Data 2, . . . Data N corresponds to a channel of the transmitter 10. It should be noted that "channel" as used herein simply refers to a communication channel to convey information, whereas an RF beam or RF wave refers to the electromagnetic waves that form a communication channel. The communication channel may itself be formed of a plurality of discrete communication channels. For example, the communication channel may carry information from multiple data streams (Data n) encoded with conventional encoding techniques, such as TDMA (time division multiple access), OFDM (orthogonal frequency division multiplexing), CDMA (code division multiple access), etc., where several users (several UEs) share the same frequency or frequencies of the communication channel. It should also be appreciated that a single RF beam and its communication channel may be formed instead as two or more RF beams (e.g., with the same complex vector $X_n$—as will be described below) with the multiple RF beams simultaneously transmitted to converge at different locations associated with different UEs.

The conversion process of channel encoder 300 to convert the N digital data streams Data 1, Data 2, . . . Data N into M analog vector signals takes into account channel-state information obtained by the receiver portion of the communication system to direct the RF wave with the encoded information to the targeted user equipment (UE). In general, each of the N communication channels typically will use all of the M antennas to form an RF wave that 'converges' on the UE (or UEs). In the case of a non-scattering (line-of-sight) environment, the channel-encoder 300 performs a (spatial) Fourier transformation on the N data inputs so that the resulting NRF 'beams' or waves point in the directions of the respective UE-s. The Fourier transformation is performed digitally at every cycle of the incoming data, i.e. with the frequency of the symbol rate of the data streams. The (complex) results of the Fourier transformation are converted to analog signals that are fed to the respective vector modulators. As a result, all N data streams are transmitted simultaneously from the M-element antenna array to the corresponding UE-s. The transmission is non-blocking as long as sufficient spatial separation (orthogonality) between channels can be achieved and maintained.

Figure 2:
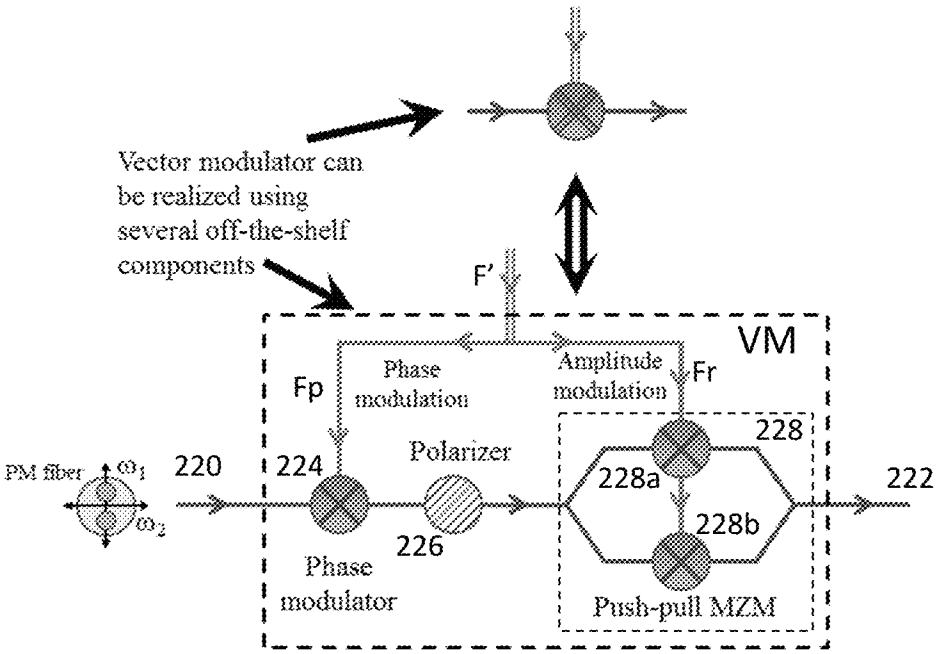
FIG. 2 illustrates an exemplary vector modulator of FIG. 1.

FIG. 2 illustrates an exemplary vector modulator VM. The input $F'_m$ to each VM is provided by the channel encoder 300 and comprises a pair of analog signals Fr and Fp provided on separate lines to the vector modulator VM. The pair of signals that carry Fr and Fp respectively carry the desired amplitude and phase of the RF to be output by a corresponding antenna 44. (to which a respective vector modulator VM is connected). As discussed further below with respect to FIGS. 3A and 3B, the signals Fr and Fp may respectively have the phase information and amplitude information encoded thereon, which may be obtained by a digital to analog conversion of digital values (r, p), and may further have the frequency shifted by mixing with a carrier frequency of the corresponding encoder mixer $EM_m$. Thus, the carrier frequency of this EM mixer also may operate to shift the frequency of the RF electromagnetic wave output by the antenna 412. connected to receive the modulated light (Beam m) output by the corresponding vector modulator VM. In the vector modulator VM, the phase information Fp is encoded into the relative phase offset between the two optical beams 114a, 114b, and the amplitude information Fr is encoded into the amplitude of one or both of the optical beams 114a, 114b. Whether the amplitude of one or both of the optical beams is modulated may be determined by the architecture of the vector modulator employed. In this exemplary vector modulator, the amplitude of both optical beams 114a and 114b is modulated. When encoding the amplitude information Fr into both optical beams, care should be given to ensure proper scaling of the RF output with the input amplitude modulation signal.

Figure 5:
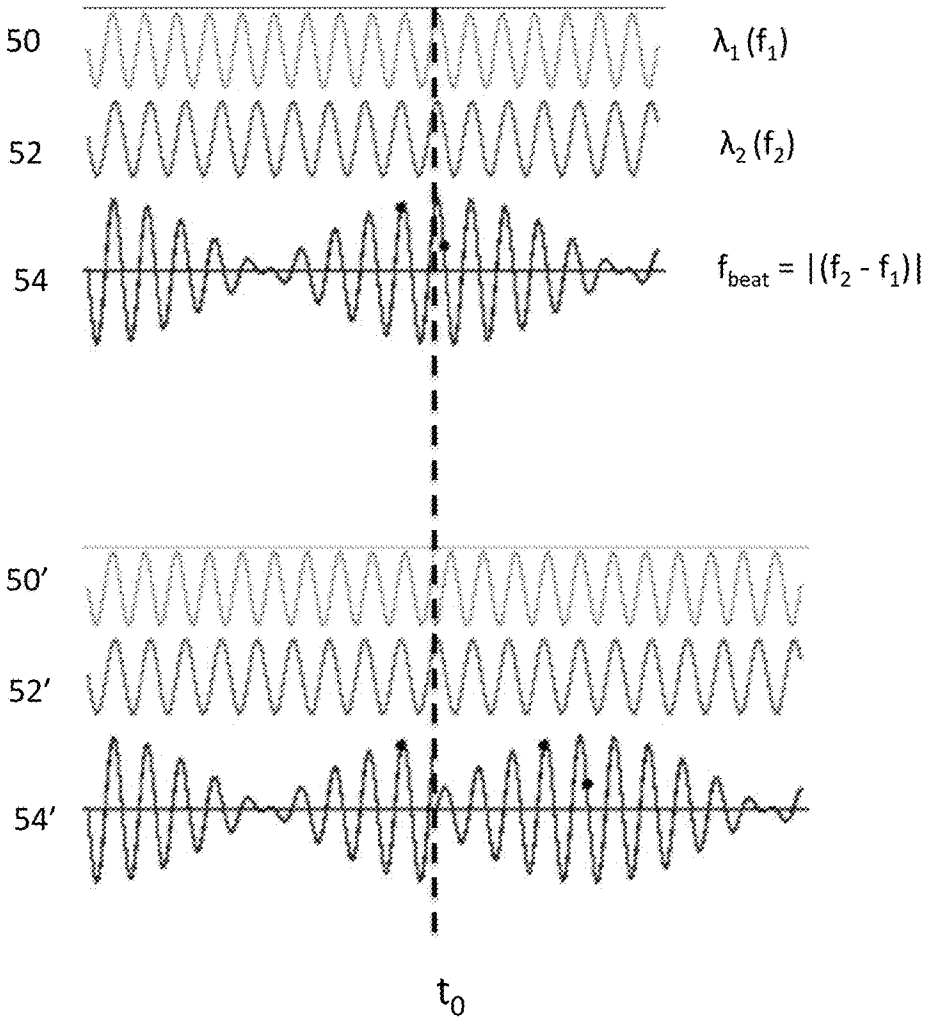
FIG. 5 illustrates exemplary optical waveforms in connection with the relationship between the wavelength offset and the RF frequency antennas of the transmitter antenna array.

FIG. 5 illustrates the relationship between the wavelength offset between optical beams 114a, 114b and the generation RF frequency of the antenna 412. driven by the combined optical beams 114a, 114b output by the vector modulator $VM_m$. In this example, the uppermost waveform 50 corresponds to a wavelength/frequency of $\lambda_1/f_1$ (e.g., of optical beam 114a), while the middle waveform 52 corresponds to a wavelength/frequency of $\lambda_2/f_2$ (e.g., of optical beam 114b). Traveling on the fast and slow axes of the PM optical fiber 120 with polarization of each optical beam perpendicular to each other, the optical beams 114a and 114b do not interfere with each other. However, after projecting the polarizations of each of these optical beams 114a and 114b onto the same optical axis, the optical beams 114a and 114b start to interfere and create the combined Beam m (labeled as 54 in FIG. 5) having a beat frequency of $|f_2-f_1|$. This beat frequency corresponds to the RF frequency, both in amplitude and phase, of the RF electromagnetic wave output by the corresponding antenna 412m.

The lower waveforms 50', 52' and 54' provide a comparative example to show the effect of phase modulating optical beam 114a by 180 degrees at time $t_0$—as can be appreciated, the resulting waveform in the combined Beam m' (54') is now formed from a destructive interference from waveforms 50' and 52' immediately after time $t_0$ while the waveform of the combined Beam m 54 results from a continuance of the constructive interference of waveforms 50 and 52. It will be thus appreciated that the phase modulation of the phase of one of the optical beams 114a, 114b by vector modulator VM causes a corresponding phase modulation of the combined Beam m with respect to its beat frequency, and with respect to the RF electromagnetic wave output by the corresponding antenna 412m.

As noted, each of the antennas 412. in the transmitter antenna array 400 transmits an RF electromagnetic wave at a frequency determined by or as a function of the wavelength offset in TOPS (the difference in wavelengths between the optical beams 114a, 114b, as determined by the TOPS 116). The RF electromagnetic wave frequency (antenna operating frequency) may be substantially the same as the inverse of the wavelength offset. For example, if the RF reference 116 has a frequency of 50 GHz, and the frequency of the analog signals Fr and Fp are each 1 GHz (which may be produced from digital to analog conversion of digital values (r, p) using commercially available DACs), the antennas 412. may operate with an RF frequency of substantially equal to 50 GHz (here, 49 GHz and/or 51 GHz). In this example, the combined optical signal Beam m will have beat frequencies of 49 GHz and 51 GHz, both of which may impinge on and drive photodetectors 410 and thus drive antennas 412. The 49 GHz and 51 GHz sidebands result from modulating by vector modulator VM of the optical signals 114a, 114b (that when combined have a 50 GHz beat frequency) with the 1 GHz analog signals Fr, Fp output by channel encoder.

In other examples, the RF electromagnetic wave frequency (antenna operating frequency) may be substantially different from the RF reference 116 frequency, and be a single sideband frequency resulting from the phase modulation and/or amplitude modulation within the vector modulator by analog signals Fr, Fp. For example, if the RF reference 116 has a frequency of 50 GHz, and the frequency of the analog signals Fr and Fp are each 10 GHz, the antennas 412. may operate with a frequency of either the 60 GHz or 40 GHz sidebands. In this case, a filter may be implemented (not shown) to remove one of the sidebands and leave the other sideband remaining. The filter may be an RF filter (not shown) provided between the photodetector 410m and the antenna 412m. The transmission to each of the spatially-separated UE-s can utilize the entire bandwidth available in the frequency band. The instantaneous bandwidth is limited by the speed of digital processing in the channel encoder and by the digital-to-analog converter (DAC) sample rate of the encoder modulators EM. The pointing accuracy of the RF beam is as high as the resolution of the DAC and can reach 16 bits at 2.8 GSPS (giga-samples per second) for commercially available products, such as DAC39J84 manufactured by Texas Instruments (see http://www.ti.com/product/dac39j 84 [Accessed: 15Jan. 2016]).

Figure 6:
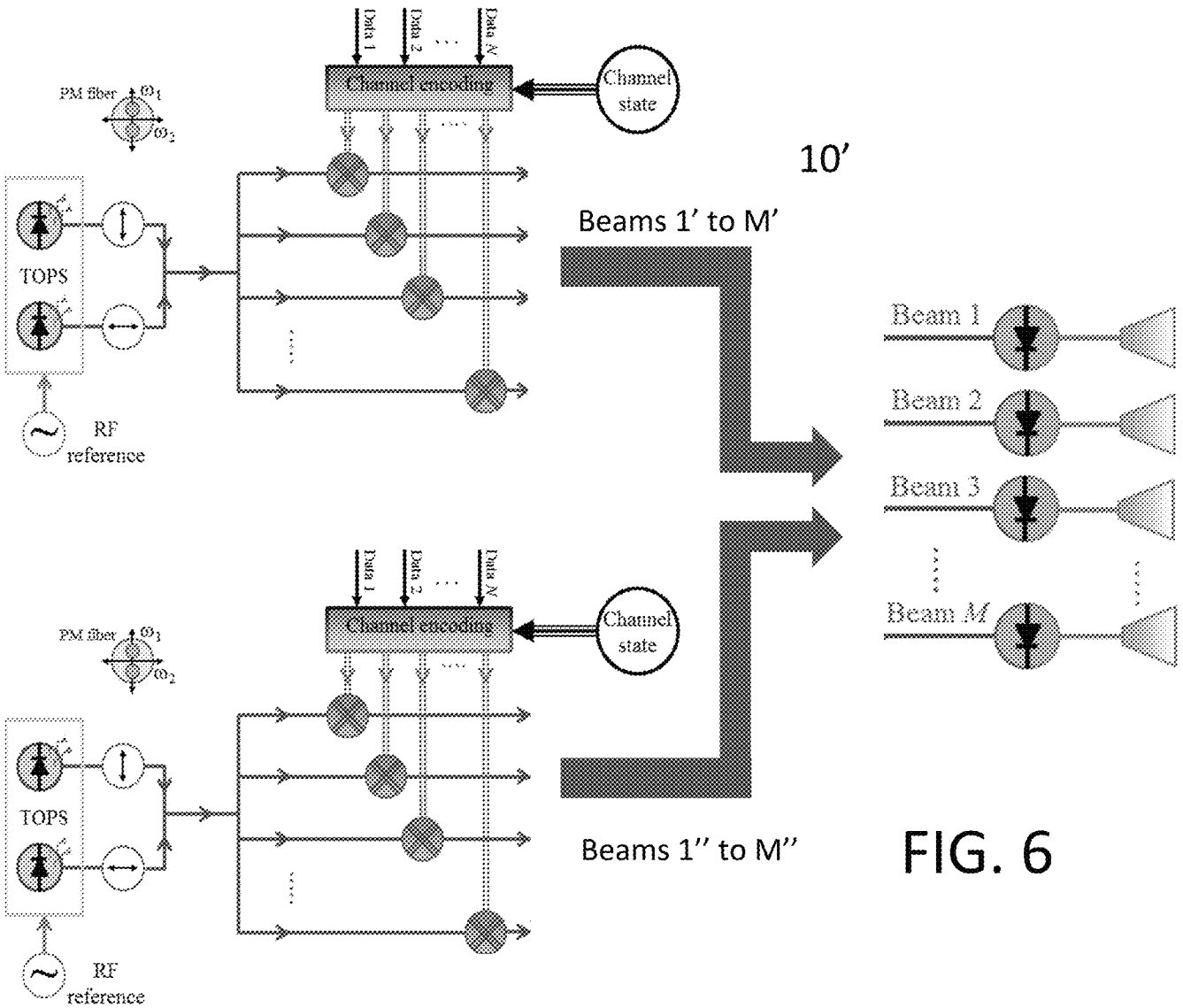
FIG. 6 illustrates an example of a plural-subsystem transmitter that may be formed by duplicating structure of the antenna transmitter described with respect to FIG. 1.

To access different frequency bands beyond the bandwidth of the channel-encoder 300 or the DAC, the TOPS 100, beam splitter 50, vector modulators 200 and channel encoder 300 may be replicated to provide multiple subsystems (each including TOPS 100, beam splitter 50, vector modulators 200 and channel encoder 300), each sub-system operating with a different frequency of the RF reference 116 (correlating to a different unshifted carrier frequency of the sub-system). FIG. 6 illustrates one example of a two-subsystem transmitter 10' (although more than 2 sub-systems may be implemented in such a configuration). The optical beams Beam 1, Beam 2 . . . Beam M generated by the different sub-systems may have different frequencies (either from use of a different TOPS RF reference frequency or by different modulation frequencies provided by the channel encoder 300. The optical beams of each subs-system (e.g., Beam m' and Beam m") may be combined at the photo-detectors (so that a Beam m of each sub-system impinges on a corresponding one of the photodetectors $\mathbf{410}_m$—either by first combining the corresponding beams (e.g. as shown in FIG. 6) and impinging the resultant combined Beam on corresponding photodetector, or by impinging the beams separately onto the photodetector such that they combine at the photodetector). Isolation between the different bands is achieved by ensuring that the TOPS sources operate at wavelengths separated sufficiently so that the beat frequency of the different TOPS-es lies outside of the frequency response limit of the photodiodes or is suppressed by the antennas. Although not shown in FIG. 6, the RF reference may have its output RF frequency adjusted as described above with respect to FIG. 1.

Vector Modulator. The following description provides further details of the exemplary vector modulator VM of FIG. 2. The role of the vector modulator VM is to impart a two-component electrical signal $F'_m$ onto the phase offset and amplitude(s) of the optical beam(s) 114a, 114b traveling as two modes (orthogonal polarizations) in a PM optical fiber 220. In addition, the vector modulator VM projects the two orthogonal polarizations at 45° to output a single linearly-polarized beam on fiber 222m that can be directed to a photo-detector 410m. Such a vector modulator may be realized using off-the-shelf components.

The optical input of the vector modulator VM is a PM fiber 220 carrying optical beams 114a, 114b in both the slow and the fast axis. The electrical input consists of two lines: One carrying phase-modulation signal Fp and the other carrying amplitude-modulation signal Fr. The phase-modulation signal Fp is directed to a phase modulator 224, such as a lithium-niobate modulator manufactured by Phase Sensitive Innovations, Inc. However, other phase modulators may be used. The amplitude-modulation signal Fr is directed to an amplitude modulator 228 such as a Mach-Zehnder push-pull modulator as depicted in FIG. 2. However, other amplitude modulators may be used.

The modulation efficiency ($V_\pi$) of a lithium-niobate modulator is polarization dependent due to different values of the electro-optic coefficients $r_{33}$ and $r_{13}$ in the nonlinear crystal. In lithium niobate, according to DC12_LN (See OptCrys_8/99-LNmatProperties.pdf." [Online] Available: http://www.goochandhousego.com/wp-content/pdfs/LN-matProperties.pdf. [Accessed: 15 Jan. 2016]) $r_{13}$=10 whereas $r_{33}$=33, which means that the mode polarized along the crystalline z-axis, that is largely parallel to applied electric field in a conventional lithium-niobate phase modulator, will undergo a phase shift three times as large as the mode polarized perpendicular to the crystalline z-axis under the effect of externally applied voltage. As a result, phase offset will ensue between the two optical signals 114a, 114b propagated on the two modes entering the modulator VM.

Following the phase modulator 224, the modes are projected in a polarizer 226 onto an axis tilted at 45° with respect to the polarization of the two modes. This mode projection places both of the beams 114a, 114b in the same mode at the cost of 3 dB loss to the optical power. This linearly polarized combined optical beam (Beam 1, Beam 2, . . . [generically referenced as Beam m]) is then directed to an amplitude modulator 228 that receives the amplitude-modulation signal Fr from the electrical input of the vector modulator VM. In FIG. 2, the amplitude modulator 228 takes the configuration of a conventional Mach-Zehnder push-pull arrangement where the input optical beam is first split into two equal parts, the phases in the two parts undergo modulation in opposite directions via modulators 228a, 228b, and the beams are combined into a single output on optical fiber 222. Thus, the phase modulation in the two arms is converted to amplitude modulation of the combined beam.

This way, at the output on fiber 222 of the vector modulator VM illustrated in FIG. 2, the phase offset between the input beams 114a, 114b is modulated according to the phase-modulation signal Fp, whereas the amplitudes of the optical beams are modulated according to the amplitude-modulation signal Fr at the input of the vector modulator VM.

In some examples, the functionality of the vector modulator VM may potentially be achieved using a single component. In this case, attention should be given to coupling and modulation efficiencies in the different polarizations to achieve desired performance.

It is noted that the frequency response of the vector modulator VM need only be as high as the baseband frequency of the electronic signal containing the data. The latter is limited by the presently available digital to analog converters (DAC-s). For example, if using a high speed digital to analog converter ,such as DAC39J84 manufactured by Texas Instruments (see http://www.ti.com/product/dac39j84[Accessed: 15 Jan. 2016]), to its full capacity, a vector modulator with a bandwidth of zero to 1.4 GHz would be adequate. Such frequency of operation may be considered low by the standards of fiber-based telecommunication.

Figure 3A:
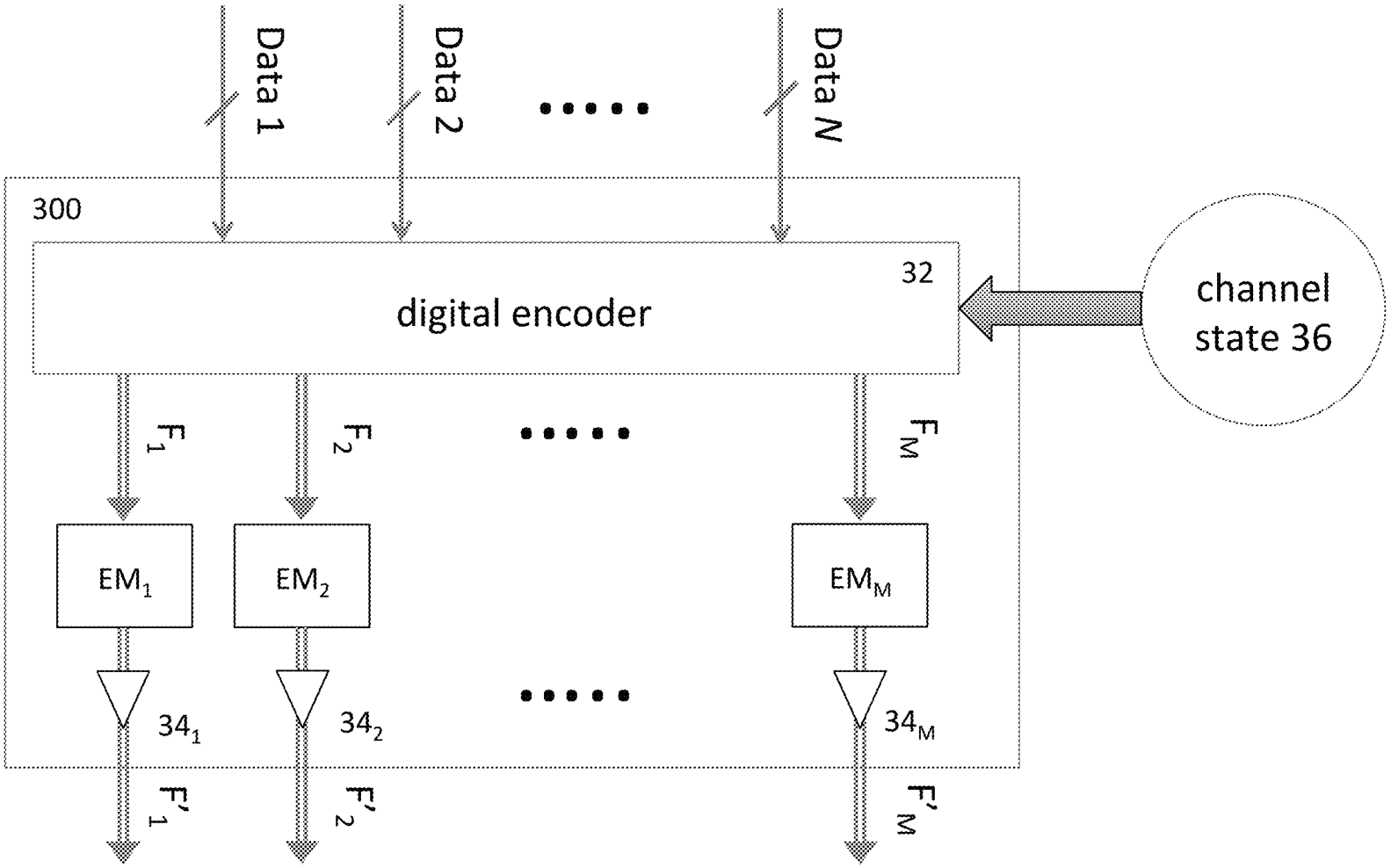
FIG. 3A illustrates exemplary configuration of channel encoder of FIG. 1.

Channel Encoder. FIG. 3A illustrates exemplary configuration of channel encoder 300. The channel encoder 30 comprises a digital encoder 32 that converts digital data streams Data 1, Data 2, . . . Data N, targeted for different users to phase-and-amplitude profiles that yield one or more RF beams/channels carrying data directed at the respective UE-s. As noted herein, the RF beam may comprise a single physical RF beam, but may also have other forms intended to have the RF energy resulting from the communication channel of RF beam converge on one or more UEs. The digital encoder may comprise a special purpose processor, such as a digital signal processor (DSP), a general purpose microprocessor (MPU), a graphics processor unit (GPU), or other computer configurations, configured to perform transformation of the data streams Data 1, Data 2, . . . Data N into a set of M complex digital numbers $F_1$, $F_2$ . . . $F_M$, where each complex digital number comprises a pair of digital values (a, b) representing the real and imaginary portion of the corresponding digital number $F_m$, or the modulus and argument of said number, or any other suitable representation of the complex digital number.

The complex digital numbers $F_1$, $F_2$ . . . $F_M$ are output by the digital encoder 32 to a corresponding set of encoder modulators $EM_1$, $EM_2$ . . . $EM_M$. Each encoder modulator $EM_m$ converts a corresponding complex digital number $F_m$ to an analog form by digital-to-analog conversion of each of the pair of digital values (r, p) and outputting the modulated signals as a corresponding pair of analog signals $F'_m$ on two separate output lines from each encoder modulator EM. It should be noted that each of the signals may be a differential signal where the output line associated with each differential signal comprises two separate conductor lines, such as a coaxial cable. As discussed below, optionally signals may further be shifted in frequency by mixing them with a suitable sub-carrier. Thus, each pair of analog signals $F'_m$ represents a corresponding complex digital number $F_m$ in analog form. The set of signal pairs $F'_1$, $F'_2$ . . . $F'_M$ are transmitted to the array of vector modulators 200. As discussed below, optionally signal pair $F'_m$ may be transmitted to a corresponding one of the vector modulators $VM_1$, $VM_2$ . . . $VM_M$ of the vector modulator array 20 after having each of its signals amplified by a corresponding amplifier.

Figure 3B:
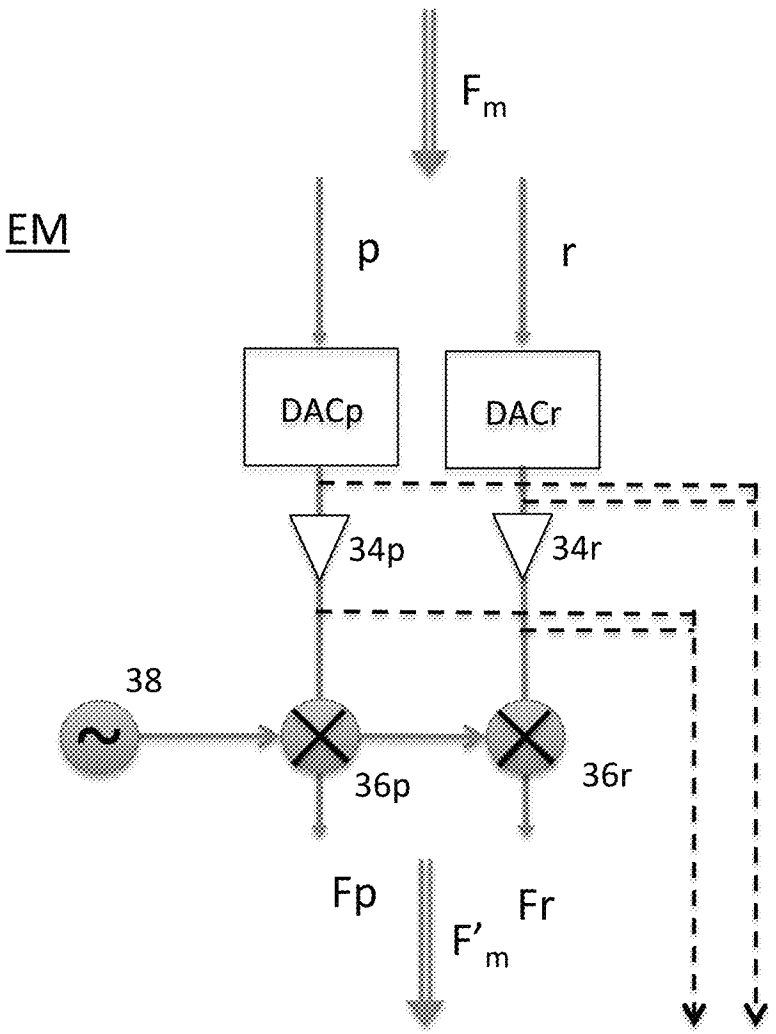
FIG. 3B illustrates an exemplary configuration of an encoder modulator of FIG. 3A.

FIG. 3B illustrates an exemplary configuration of an encoder modulator EM. When the complex digital number $F_m$ is provided by digital encoder 32 in rectangular form (comprising real and imaginary values as (x, jy) Cartesian coordinates), the Cartesian complex digital number may first be converted to its polar form (r, p) (equivalent to the radius r and polar angle Θ, respectively) prior to digital to analog conversion. FIG. 3B illustrates the complex digital value (r, p) in polar form having each of its digital components r and p being converted to analog signals by digital to analog converters DACr and DACp, respectively, and then amplified by amplifiers 34r and 34p. The analog signals generated by DACr and DACp, respectively, and then amplified by amplifiers 34r and 34p may have a frequency chosen based on the antenna transmitter operational frequency limited by the operational frequency of the digital to analog converter. Commercially DAC may generate a analog signal up to and over 1 GHz.

The analog signal outputs of the amplifiers 34r and 34p may each be respectively upconverted to a higher frequency analog signal Fr and Fp by mixers 36r and 36p, each being fed a carrier frequency from oscillator 38. It should be appreciated that the carrier frequency here is with respect to the lower frequency analog signals provided by DACr and DACp. The analog signals generated by DACr and DACp may be directly output from DACr and DACp as the analog signal $F'_m$ (comprising component signals Fp and Fr) (i.e., without amplification or further upconversion to a higher frequency) or may be directly output as the analog signal $F'_m$ from amplifiers 34r and 34p (i.e., without further upconversion), such options being shown by the dashed lines in FIG. 3B. Thus, analog signals Fr and Fp (F'm) may provide phase and amplitude information, either at the frequency determined by the digital to analog converters DACr and DACp or by the carrier frequency provided by oscillator 38.

Channel encoding takes place in digital domain, in the digital encoder 32 of FIG. 3A. Before the encoding can take place, a channel state is determined for each of the N channels. The channel state may be measured by the same aperture that is used to transmit the data. Channel state information may be measured using any known techniques. See, e.g., U.S. Pat. No. 6,473,467 (incorporated by reference for this purpose), discussing several such techniques. The channel state for the channel corresponding to n-th UE is represented by a complex vector Xwhose entries correspond to amplitudes and phases received by the individual antennas of the array in the channel-state measurement step. Since there are M antennas in the array, the channel state is encoded in a 1-by-M array of complex numbers.

Transmitted data are encoded as symbols represented by points in two dimensions. Equivalently, each symbol can be represented as a complex number with the real and imaginary parts corresponding to the two different dimensions. For the n-th data channel, $D_n(t)$, where t is time, will be used to represent the stream of symbols to be sent to n-th channel.

If N different UE-s are found with 'sufficiently' orthogonal channels, i.e. $\langle X_n, X_{n'}\rangle \approx 0$ for all pairs $n \neq n'$ then the following complex vector is formed $$X(t) = \sum_{n=1}^{N} D_n(t) X^*_n, \tag{1}$$

where $X^*_n$ is a properly normalized version of $X_n$ to account for signal strength variations required for different the UE-s, and the asterisk represent complex conjugation. Vector X(t) has M complex entries, where each entry corresponds the amplitude and phase of the RF wave to be transmitted from each of the M antennas of the array. Entries of the vector X(t) are converted to a format suitable for the respective vector modulator of the MU-MIMO transmitter 10 of FIG. 1. For example, if a vector-modulator architecture FIG. 1 is used, amplitude and phase of the complex numbers are output by the digital encoder 32. The results are then converted to analog domain by encoder modulators EMm and amplified for the use in the vector modulators VMm.

It is noted that according to Eq. (1), the RF beam forming happens at the rate at least as high as the fastest symbol rate to be transmitted to a UE at the receiving end; the optical layer of the MU-MIMO system can easily accommodate tens of GHz. The data are transmitted simultaneously to all UE-s, and the encoding scheme is arbitrary: different UE-s can use different encodings.

For UE-s having channels insufficiently orthogonal, conventional channel separation is used such as the employment of CDMA, OFDM, TDMA, etc. On the other hand, to minimize interference between channels that are imperfectly separated spatially, and to maximize spectrum reuse and data throughput, orthogonalization procedure can be applied to vectors $X_n$ before forming vector X(t) in Eq. (1). Other processing to vectors $X_n$ prior to forming vector X(t) may also be applied to achieve desired transmission characteristics. It is also noted that since the RF beam forming happens at the symbol rate, the channel state encoded in vectors $X_n$ can also be updated at the same rate. This provides means to follow dynamic changes in the channel-state space induced, for example, by moving objects. Such ability will be particularly valuable when transitioning to higher frequencies where small physical displacement may correspond to multiple wavelengths of the transmitted RF, and therefore a potentially considerable change in channel state. In the absence of sufficiently frequent channel-state measurement, instantaneous states of the channels can be approximated by extrapolation from the available measurements.

In free space, each RF beam may correspond to a single physical beam (e.g., cone shaped) of RF radiation whose center is directed to an end user UE. In typical usage, due to the presence of scattering from objects in the RF scene, each RF beam may be formed differently. For example, an RF beam may comprise a wave-front generated at the antenna array, that upon interacting with (scattering off of) the environment, 'converges' on the intended target (or targets), e.g., converges on the user equipment (UE). For example, if there is a wall in the scene, then the array may send two separate 'physical' beams as the RF beam, a first physical beam pointing to and sent directly to the target (UE), and a second physical beam to be reflected from the wall and impinge the target (UE), so that both the first and second physical beams intersect at the intended target. In this example, the combination of these two 'physical' beams constitute a single RF beam.

In general, each complex vector $X_n$ defines an RF beam with values of the vector elements selected to take into account environmental scattering (walls, buildings, cars, etc.) and the position(s) of the UE(-s) so as to produce the desirable electromagnetic field at the UE(-s). (Note, however, in some examples, a complex vector $X_n$ may be defined to produce a minimum field at locations that are not the target to minimize interference.) In the simple case of free space, this RF beam may take a particularly simple form, i.e. a conical distribution of electromagnetic field, that is obtained by phase shifting RF outputs of each antenna across the array. However, in general, generating each desired RF beam typically entails the adjustment of both amplitude and phase at the individual antenna elements to apply a certain amplitude and phase profile to the antenna array. Thus, each antenna in the antenna array is provided with corresponding phase and amplitude component values corresponding to each complex vector $X_n$ (defining the amplitude and phase profile for the RF beam) where the final phase and amplitude of the RF signal output by each antenna corresponds to the summation of these corresponding phase and amplitude component values of each of the complex vectors $X_1 \ldots X_N$ multiplied by respective data streams $D_1(t), \ldots, D_N(t)$ to simultaneously generate each of the RF beams modulated by the respective data stream.

Each complex vector $X_n$ comprises M complex entries (a complex number as an entry with two real numbers rather than a single real scalar value), where M is equal to the number of antennas in the array. Each complex vector $X_n$ forms a column in matrix X. In other words, matrix X consists of N columns complex vectors $X_n$ where each vector complex vector $X_n$ has M entries. So, matrix X is an M-by-N matrix.

In this example, the X matrix is built out of columns of $X_n$ vectors ($X_1$, $X_2$, etc.). Each of the $X_n$ vector column defines an amplitude+phase profile across the antenna array 400 that generates the desired RF beam and thus may define one or more locations where the RF beam converges (respectively associated with one or more UEs). This provides a direct 1-to-1 correspondence between each of vectors $X_n$ and a corresponding RF beam generated by the antenna array 400.

The data stream $D_n(t)$ is multiplied with a respective vector $X_n$ to produce an RF beam modulated with said data stream to converge at a particular location or set of locations that is unique to that data stream (and vector $X_n$). Each data stream $D_n(t)$ may be thought of as a stream of complex numbers (e.g. I/Q), where each number corresponds to a point in the respective constellation (e.g., QAM constellation), i.e., a symbol. The present invention does not place any limit on the type of constellation used and thus multiple encoding schemes maybe implemented, such as OOK, QPSK, any QAM (16-QAM, 64-QAM, 256-QAM . . .), or even analog modulation, such as AM, FM, PM. As noted herein, further schemes that may be implemented include TDMA, OFDM, and CDMA.

Figure 4A:
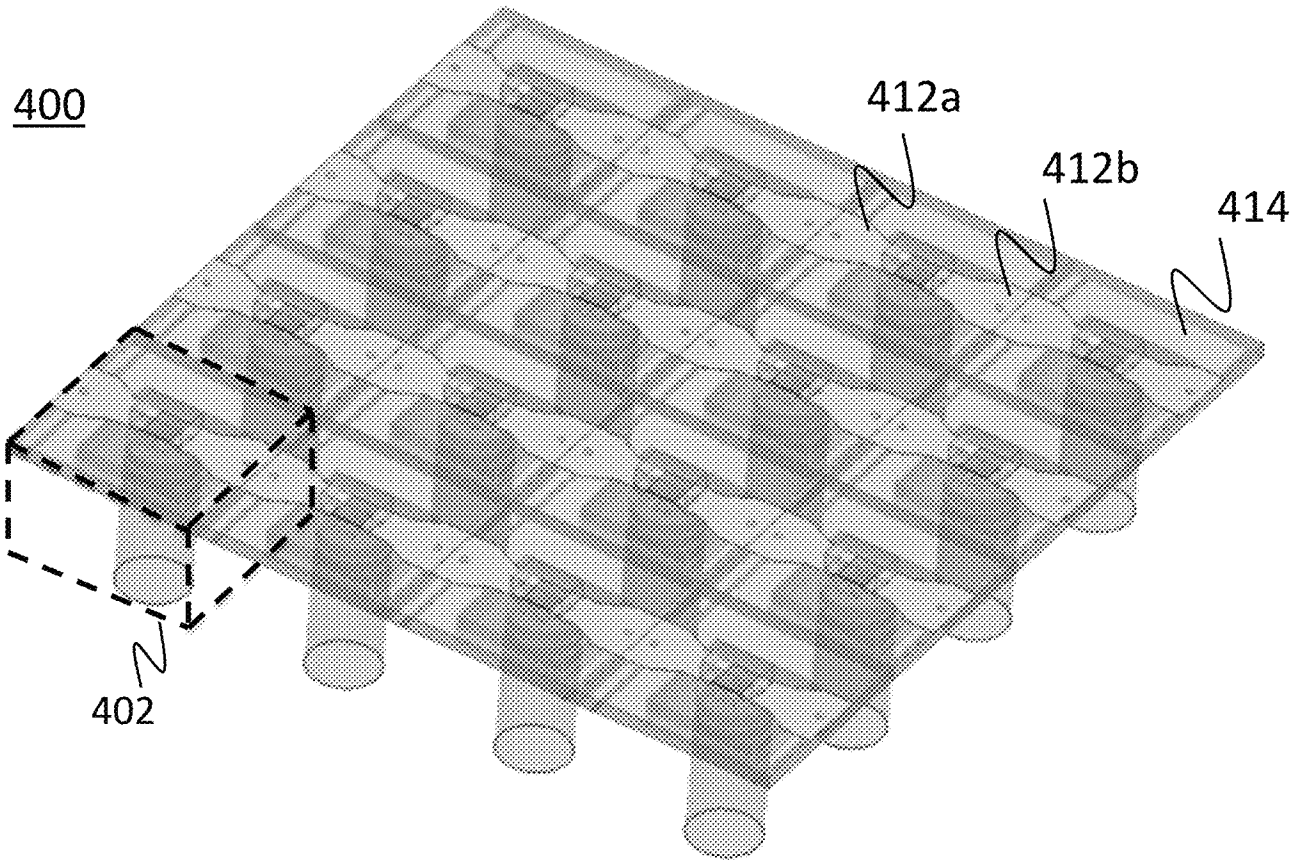
FIG. 4A illustrates one example of the structure of the antenna array of FIG. 1.

FIG. 4A illustrates one example of the structure of the transmitter antenna array 400 of FIG. 1. In this example, the transmitter array 400 is implemented as a photo-diode coupled tightly coupled array (TCA) 400' shown comprising of an array of dipole antennas (412a, 412b) excited by photodiodes 410 (which may embody the photodetectors 410 described herein) on the back surface of substrate 414. Each unit cell 402 of the TCA 400 comprises a dipole antenna (412a, 412b) having two conductive radiating arms 412a and 412b and a photodiode 410 electrically connected to the radiating arms 412a and 412b to act as a driving source for the dipole antenna (412a, 412b) of the unit cell 402. In this example, the TCA 400 comprises a plurality of unit cells 402 regularly arranged two directions.

Figure 4B:
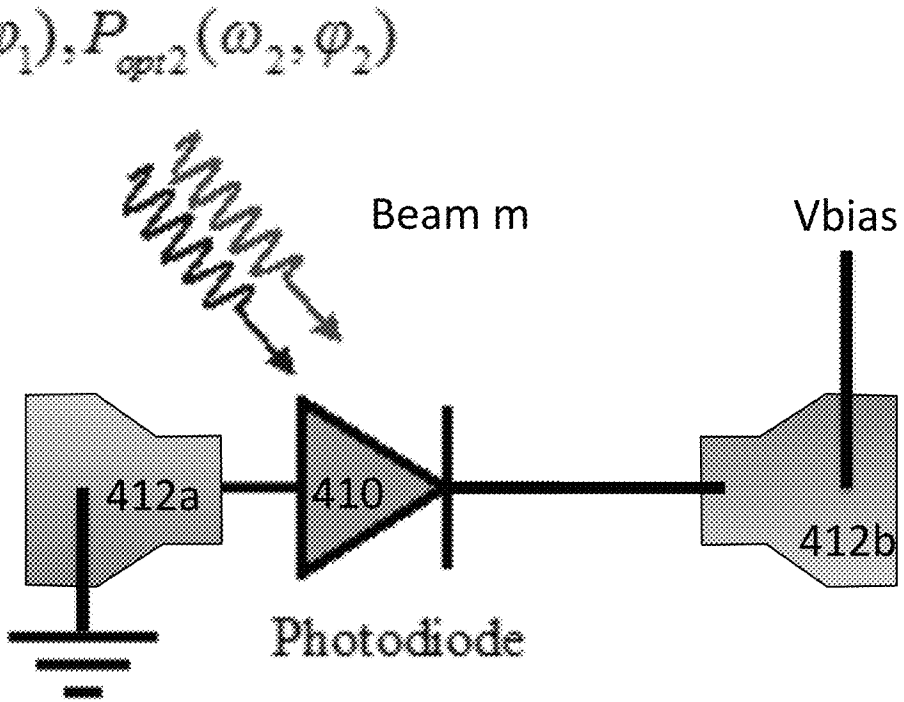
FIG. 4B is a schematic showing an electrical connection between a dipole antenna and a photodiode that may be used as unit cell of the transmitter antenna array of FIG. 4A.

As shown in FIG. 4B, for each pair of a dipole antenna 412 and a photodiode 410 of a unit cell 402, an anode of the photodiode 410 is electrically connected to one of the radiating arms 412a and a cathode of the photodiode 410 is connected electrically connected to another of the radiating arms 412b. As shown in FIG. 4B, the photodiode may be arranged to receive the combined a Beam m of described in connection with FIG. 1, composed of two optical beams having different wavelengths to excite the dipole antenna 412.

Although the example TCA of A is shown to be arranged on a planar formation, on a planar substrate 414, the substrate 414 need not be planar as shown in FIG. 4A, and instead may comprise curved surfaces, such as a concave and/or convex surface. For example, the substrate on which the antennas 412 are arranged may comprise or be formed to conform to a curved surface (e.g., body or wing) of an aircraft, and thus the arrangement of the antennas 412 may be non-planar. Details of and other examples of antenna arrays that may be used as the photo-diode connected transmitter array 400 are described in U.S. patent Ser. No. 15/242,459 filed Aug. 19, 2016, the contents of which are hereby incorporated by reference.

Figure 4C:
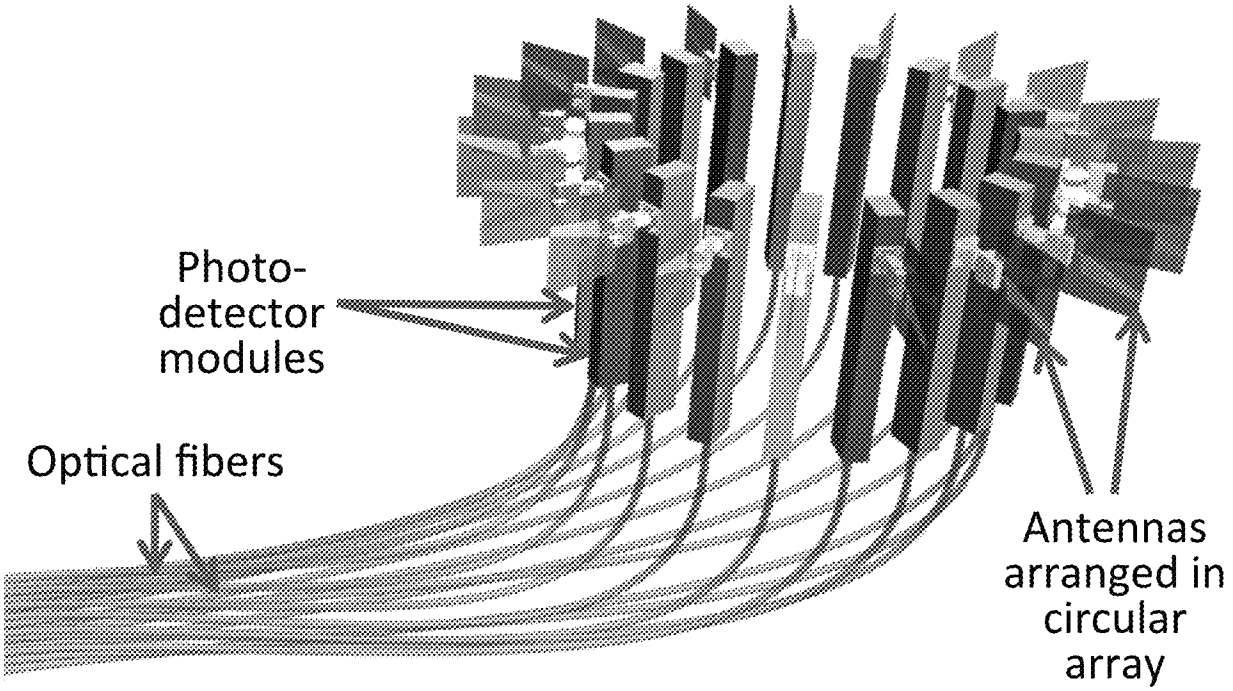
FIG. 4C illustrates an alternative arrangement of photodiode driven antennas.

The transmitter array 400 need not be a TCA array and may have other configurations, such as spherical, hemispherical, circular, conformally placed antennas 412 on various non-planar surfaces, and need not have a regular arrangement of antennas 412. FIG. 4C illustrates one example of an arrangement where the photo-diode driven antennas are arranged in a circle.

Figure 7:
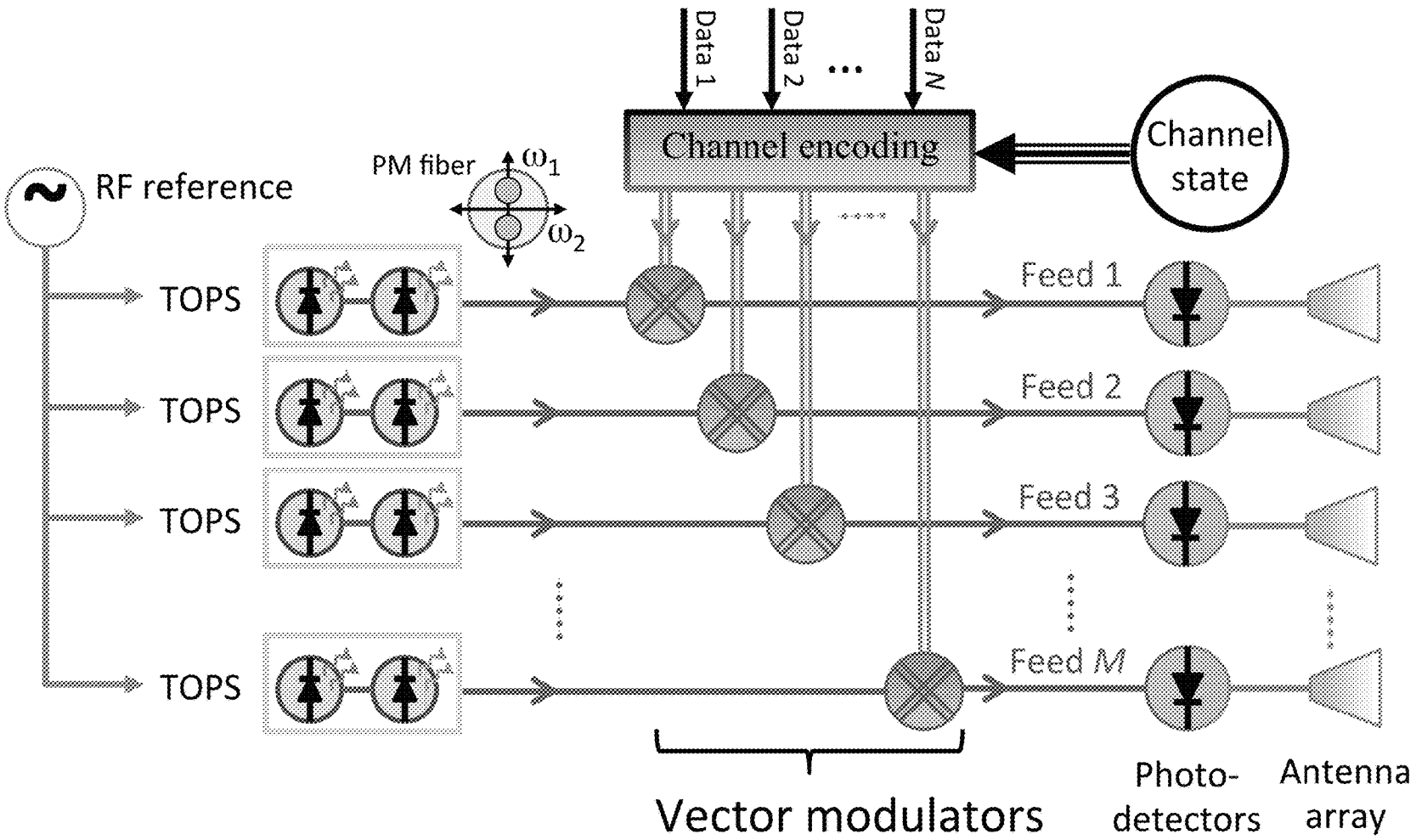
FIG. 7 illustrates an exemplary implementation that may be used with the in accordance with the structure and methods of FIG. 1 or FIG. 6.

FIG. 7 illustrates another exemplary implementation. The components of the vector modulator module 200, the channel encoder 300 and the antenna array 400 may be the same as that described herein (including the plural sub-system alternative described with respect to FIG. 6). In FIG. 7, plural tunable optical paired sources (TOPSes) 100' are implemented for the transmitting antenna array 10". In this example, one TOPS is provided for each photodetector 410/antenna 412 pair (a photodiode driven antenna). However, each TOPS may be provided for a different subsets of pairs of photodetector 410/antenna 412. By providing plural TOPS, the light beam intensity may be increased as the Beams 1—M impinge on the photodetectors 410m as compared to the single TOPS embodiment described with respect to FIG. 1. Thus, each photodetector may have a similarly increased RF power output to drive the corresponding antenna 412m to which it is connected. Such increase in power may be helpful to drive the antennas 412m without the need of an amplifier to amplify the RF signal output by the photodetector, not only reducing costs associated the amplifier, but also avoiding signal imbalance in the differential signal output by the photodetector (which is often required to be corrected by the use of expensive baluns).

The TOPS 100' differ from that described with respect to the FIG. 1 embodiment by sharing an RF reference. Sharing the RF reference causes the output optical beams 114a, 114b to be RF phase locked—that is, the beat frequency (as described herein with respect to FIG. 5) of the combination of the two optical beams 114a, 114b (when combined) will be in phase, and thus without any further downstream modulation, the phases of the RF signals generated by the photodetectors 410m and antennas 412m will also be in phase. The output optical beams 114a, 114b of each TOPS 100' need not be mutually coherent with any other TOPS 100'. Thus, optical beams 114a (e.g., the relative higher frequency optical beam of the pair of optical beams 114a, 114b) output from each TOPS 100' may have different frequencies and different wavelengths from each other and optical beams 114b (e.g., the relative lower frequency optical beam of the pair of optical beams 114a, 114b) output from each TOPS 100' may have different frequencies and different wavelengths from each other. However, the RF reference 116 will cause each optical beam pair 114a, 114b to have the same wavelength offset (the same difference in wavelengths and thus resulting in the same RF frequency used to drive the photodetectors 410m). Although not shown in FIG. 6, the RF reference may have its output RF frequency adjusted as described above with respect to FIG. 1.

Figure 8:
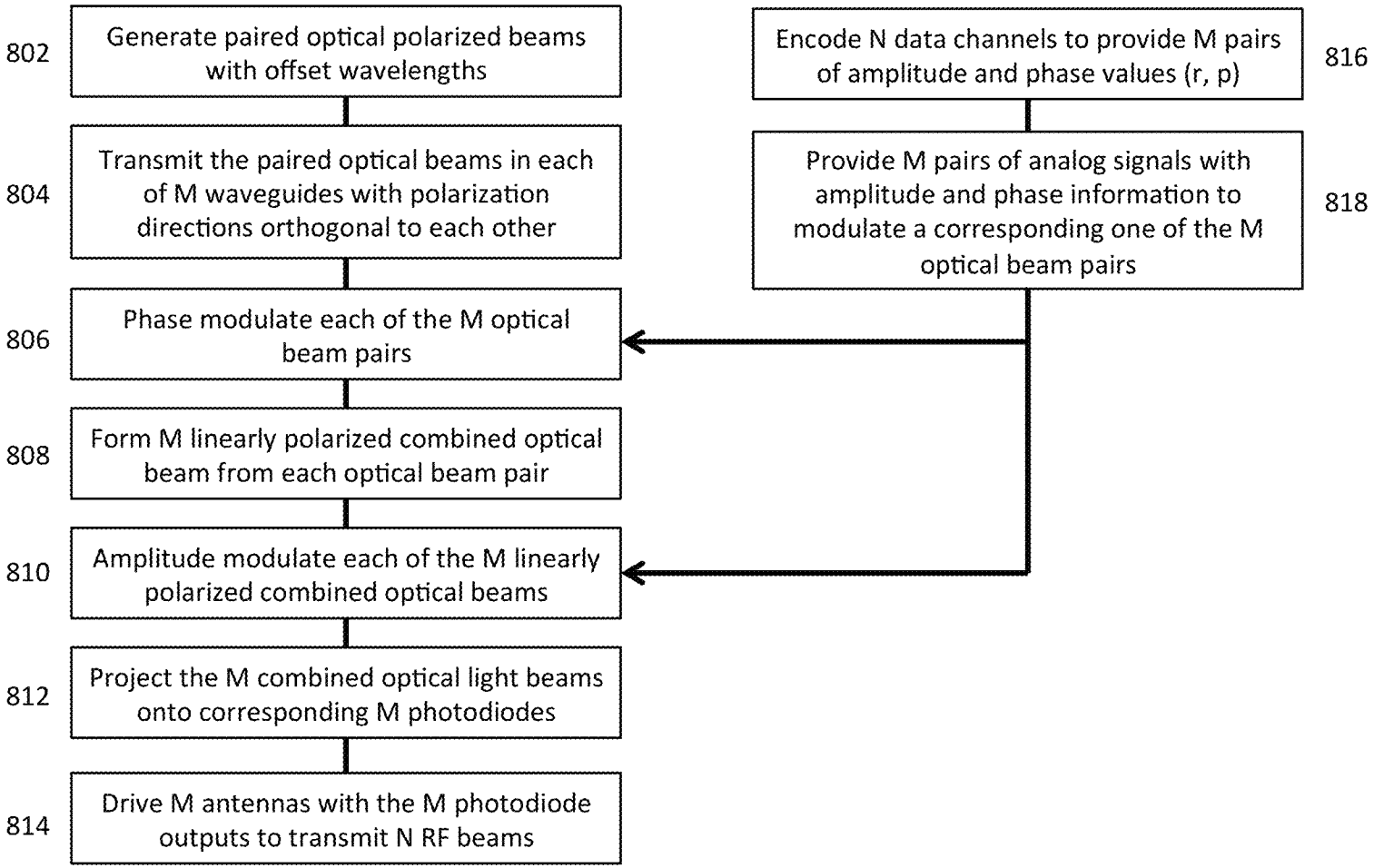
FIG. 8 illustrates method of operation of an antenna transmitter that may be applied to any of the apparatus embodiments described.

FIG. 8 illustrates method of operation of an antenna transmitter that may be applied to any of the apparatus embodiments described herein (reference may be made to those apparatus embodiments for further details and options regarding steps that may be performed in connection with the method described with respect to FIG. 8). In step 802, paired optical beams are generated, the optical beams each having a spectral line frequency and having wavelengths offset from one another. The paired optical beams may be generated using a TOPS, as described herein, and may have a wavelength offset determined by the frequency of an analog reference signal, such as the RF reference signal of the TOPS described herein. In some examples, the frequency of this analog reference signal may be adjustable to dynamically select the wavelength offset of the paired optical beams. In step S802, on pair of such optical beams may be generated by a single TOPS or a plurality of such optical beams may be generated by plural TOPS.

In step 804, M optical beam pairs are transmitted on each of M waveguides, with the polarization directions of the optical beams (of an optical beam pair) orthogonal to each other. Having polarization directions orthogonal to each other allows the optical beams to be transmitted in the waveguide without interfering with one another. Each of the M optical waveguides may be an optical fiber, such as a PM optical fiber. Each of the M optical beam pairs may be formed from the same source (e.g., same TOPS) or may be formed from separate sources (e.g., several TOPS). The frequencies of the 2M optical beams need not be coherent with each other, and thus may be out of phase with each other and have different frequencies from each other. The beat frequencies of the optical beam pairs within a waveguide may have the same frequency and may be in phase with each other.

In step 806, at least one of the optical beams is phase modulated in an electro-optical phase modulator. The phase modulator may be a lithium-niobate, but other optical phase modulators may be used. The phase modulation may be unequally performed or asymmetrically performed on the pair of optical beams so that a phase shift occurs more significantly with respect to one of the optical beams as compared to the other of the optical beams. The phase modulation of may be determined by phase modulation information p provided with an analog electrical signal Fp to the phase modulator. The phase modulation may be performed by without splitting the pair of optical beams from each other.

In step 808, the polarization direction of the optical beams of each of the M optical beam pairs are projected onto the same axis to allow the optical beams of an optical beam pair to interfere with each other. A polarizer may be used to perform this alignment of the polarization axes of the optical beams. For each of the M pairs of optical beams, a combined optical beam that is linear polarized is formed that has a beat frequency determined by the difference of the wavelengths of the optical beams of the optical beam pair.

In step 810, the combined optical beam is amplitude modulated by an amplitude modulator. The amplitude modulator may be a Mach-Zehnder push-pull modulator, but other optical amplitude modulators may be used. The amplitude modulation may be determined by amplitude modulation information r provided with an analog electrical signal Fr to the amplitude modulator. Steps 806, 808 and 810 may be performed by a vector modulator for each of the M optical pairs.

In step 812, each of the M modulated combined optical beams are projected onto a corresponding photodetector (which may be a photodiode). In response to the received combined optical beam, each photodiode may generate an electrical signal having an RF frequency corresponding to the beat frequency of the combined optical beams, which is then transmitted to a corresponding antenna of the antenna array, to which the photodetector output is connected.

In step 814, an antenna array transmits on or more RF beams. Each antenna may radiate an electromagnetic wave having a frequency and phase as provided by a corresponding photodetector to which it is connected. The combined RF radiation of the plurality of antennas may form the one or more RF beams. Each RF beam may be formed to converge on at least one targeted user equipment. Each RF beam may be modulated through time (based on the phase and amplitude modulation information (r, p)) to provide a communication channel (that may include a plurality of sub-channels). Information provided by the communication channel may be decoded by the user equipment. The decoded information may be digitized to its original form and may comprise audio, video and/or data.

Steps 816 and 818 of FIG. 8 also provide an example of the generation of analog electrical signals Fr and Fp. In step 816, N data channels are encoded by a matrix X to provide M pairs of amplitude and phase values (r, p), which may be in the form of digital data. Each data channel may be a stream of symbols. The matrix X may comprise N columns of complex vectors, each complex vector $X_n$ defining the amplitude and phase profile for a corresponding RF beam (and the corresponding channel) it forms. Each complex vector $X_n$ may be obtained from channel measurement for one of the corresponding channels each formed by an RF beam.

In step 818, each of the M amplitude and phase value pairs (r, p) is converted from digital to analog, and provided as an analog electrical signal Fr and Fp to modulate a corresponding pair of optical beams.

Channel Encoding Example. In this example, the data inputs are in the form of complex numbers. The real and imaginary parts may represent the I and Q components of an arbitrary modulation scheme. As such, at any given time t, the n-th data input $D_n(t)$ represents a symbol to be transmitted to the n-th UE. The data encoding schemes in the different data inputs need not be the same and may even be fed at different rates as long as the lowest common multiple of the data rates is below the processing-speed capability of the channel-encoding block. Thus, one data input $D_n(t)$ may result in a first encoding scheme (e.g., OOK) for the associated RF beam, while a second data input $D_{n+1}(t)$ may result in a second encoding scheme (e.g., 16 QAM) for the associated RF beam. The n data inputs are organized into a vector $$\begin{pmatrix} D_1 \\ D_2 \\ \\ D_N \end{pmatrix} = D. \tag{2}$$

Channel encoding performs a linear matrix multiplication $$F=XD, \tag{3}$$

where F is a vector of complex numbers $$F = \begin{pmatrix} F_1 \\ F_2 \\ \\ F_M \end{pmatrix} \tag{4}$$

whose entries represent the instantaneous modulation (phase and/or amplitude) to be applied to the optical feeds for the respective antennas of the array. Matrix X takes into account channel-state information to yield proper RF beamforming. Thus, the output of the channel-encoding block comprises M pairs of signals, where each pair represents a complex number $F_n$. The representation of the complex numbers may be, for example, in the form of the real and imaginary parts or in the form of its absolute value (amplitude) and argument (phase). The latter representation may be used as an input to vector modulators with architecture described above.

Example

Consider a scene with two spatially-separated UE-s and no scattering. Assume further that forming an RF beam with angular frequency Ω directed at the first UE requires the M antennas to apply phases $$2\pi\frac{d_1}{M}, 2\pi\frac{2d_1}{M}, 2\pi\frac{3d_1}{M}, , 2\pi\frac{(M-1)d_1}{M}, 0 \tag{5}$$

to the transmitted waves, where $d_1$ is an integer between 1 and M. Note that the phase changes linearly with the position of the antenna in the array, which leads to the formation of a beam directed at a certain angle from the direction normal to the antenna-array plane. Similarly, assume that to direct the RF beam to the second UE requires phases $$2\pi\frac{d_2}{M}, 2\pi\frac{2d_2}{M}, 2\pi\frac{3d_2}{M}, , 2\pi\frac{(M-1)d_2}{M}, 0 \tag{6}$$

at the respective antennas, where $d_2$ is an integer between 1 and M, and $d_1 \neq d_2$. Note that the last condition of differing $d_1$ and $d_2$ corresponds to spatial separation of the UE-s—the two RF beams point in two different directions.

According to Eq. (2), the two data inputs form a vector $$D = \begin{pmatrix} D_1 \\ D_2 \end{pmatrix}. \tag{7}$$

To satisfy expressions (5) and (6) for phases required to direct the RF beams to the respective UE-s, channel-encoding matrix X takes the following form $$X = \begin{pmatrix} \exp\left(2\pi j\frac{d_1}{M}\right) & \exp\left(2\pi j\frac{d_2}{M}\right) \\ \exp\left(2\pi j\frac{2d_1}{M}\right) & \exp\left(2\pi j\frac{2d_2}{M}\right) \\ \exp\left(2\pi j\frac{Md_1}{M}\right) & \exp\left(2\pi j\frac{Md_2}{M}\right) \end{pmatrix} = \begin{pmatrix} \exp\left(2\pi j\frac{d_1}{M}\right) & \exp\left(2\pi j\frac{d_2}{M}\right) \\ \exp\left(2\pi j\frac{2d_1}{M}\right) & \exp\left(2\pi j\frac{2d_2}{M}\right) \\ 1 & 1 \end{pmatrix}. \tag{8}$$

As a result, the complex inputs to the M modulators are $$F = \begin{pmatrix} D_1\exp\left(2\pi j\frac{d_1}{M}\right) + D_2\exp\left(2\pi j\frac{d_2}{M}\right) \\ D_1\exp\left(2\pi j\frac{2d_1}{M}\right) + D_2\exp\left(2\pi j\frac{2d_2}{M}\right) \\ \\ D_1 + D_2 \end{pmatrix}. \tag{9}$$

The complex numbers of Eq. (9) multiply the RF carrier exp (jΩt) via the interaction in the vector modulators followed by photodiodes coupled to the respective antennas. As a result, the RF wave radiated by the antennas have the following form $$\begin{pmatrix} D_1\exp\left(j\Omega t + 2\pi j\frac{d_1}{M}\right) + D_2\exp\left(j\Omega t + 2\pi j\frac{d_2}{M}\right) \\ D_1\exp\left(j\Omega t + 2\pi j\frac{2d_1}{M}\right) + D_2\exp\left(j\Omega t + 2\pi j\frac{2d_2}{M}\right) \\ \\ D_1\exp(j\Omega t) + D_2\exp(j\Omega t) \end{pmatrix}. \tag{10}$$

Consider an on-off keying (OOK) modulation—the simplest form of amplitude-shift keying modulation. In this case, the data inputs $D_1$ and $D_2$ take one of two values: 0 or 1. If both $D_1$ and $D_2$ are 0, then, according to expression (10), the antennas transmit no wave, and therefore both UE-s receive the bit value of 0. If $D_1=1$ and $D_2=0$, then according to (10), the antennas transmit the following waveforms $$\begin{pmatrix} \exp\left(j\Omega t - 2\pi j\frac{d_1}{M}\right) \\ \exp\left(j\Omega t + 2\pi j\frac{2d_1}{M}\right) \\ \exp(j\Omega t) \end{pmatrix}. \tag{11}$$

Per (5), the antenna array will generate a single beam directed at $UE_1$. In this case, $UE_1$ will receive the bit value of 1 whereas $UE_2$ will receive the bit value of 0 since no RF beam is transmitted in its direction. For $D_1=0$ and $D_2=1$, according to (10), the antennas transmit the following waveforms $$\begin{pmatrix} \exp\left(j\Omega t + 2\pi j\frac{d_2}{M}\right) \\ \exp\left(j\Omega t + 2\pi j\frac{2d_2}{M}\right) \\ \exp(j\Omega t) \end{pmatrix}, \tag{12}$$

which according to (6) yields an RF beam directed at $UE_2$. As a result, $UE_2$ receives the bit value of 1 whereas $UE_1$ receives the bit value of 0 since no RF beam is transmitted in its direction.

When both $D_1$ and $D_2$ are 1, then according to (10), the antennas transmit the following waveforms $$\begin{pmatrix} \exp\left(j\Omega t + 2\pi j\frac{d_1}{M}\right) + \exp\left(j\Omega t + 2\pi j\frac{d_2}{M}\right) \\ \exp\left(j\Omega t + 2\pi j\frac{2d_1}{M}\right) + \exp\left(j\Omega t + 2\pi j\frac{2d_2}{M}\right) \\ \exp(j\Omega t) + \exp(j\Omega t) \end{pmatrix}. \tag{13}$$

which can be written as $$\begin{pmatrix} \exp\left(j\Omega t + 2\pi j\frac{d_1}{M}\right) \\ \exp\left(j\Omega t + 2\pi j\frac{2d_1}{M}\right) \\ \exp(j\Omega t) \end{pmatrix} + \begin{pmatrix} \exp\left(j\Omega t + 2\pi j\frac{d_2}{M}\right) \\ \exp\left(j\Omega t + 2\pi j\frac{2d_2}{M}\right) \\ \exp(j\Omega t) \end{pmatrix}, \tag{14}$$

that is a superposition of two beams, one directed at $UE_1$ per (5), and the other directed at $UE_2$ per (6). As a result, in this case, both UE-s receive the bit value of 1.

As the values of $D_1$ and $D_2$ change in time according to the data streams input to the channel-encoding block, RF beams are formed as explained above. The beam-forming takes place at (at least) the rate the data are transmitted—every cycle of symbols yields an RF wave-form corresponding to the data to be sent. This way, each of the UE-s receives the data stream intended for it and no data intended for the other UE.

When using modulation schemes more sophisticated than OOK, with more than two UE-s, and a more complex scattering environment, the data streams are directed to the corresponding UE-s. For cases where the beams directed at the spatially separated UE-s are not strictly orthogonal, additional processing is beneficial to minimize the interference. In general, spatial diversity should be considered an additional degree of freedom, besides carrier frequency and (orthogonal) data encoding, to encode data streams and provide increased aggregate data throughput to UE-s.

A transmitter to be used in wireless multi-user MIMO has been described above. The system combines the virtues of digital, analog and optical processing to arrive at a solution for scalable, non-blocking, simultaneous transmission to multiple UE-s. The system architecture is independent of the RF carrier frequency, and different frequency bands can be accessed easily and rapidly by tuning the optical source (TOPS). The data channels are established in the digital domain and the RF beam-forming accuracy is only limited by the available resolution of DAC, which can be as high as 16 bits for 2.8 GSPS in off-the-shelf components.

The antenna transmitters described herein may operate and communicate with a wide range of radio frequencies, such as millimeter wave (e.g., about 30 to 300 GHz), microwave (e.g., 1 to 170 GHz), SHF (3 GHz to 30 GHz), UHF (300 MHz to 3 GHz), VHF (30 to 300 MHz), to radio frequencies as low as 300 KHz or even 30 KHz. The invention may also be used with other communication frequencies outside of radio frequencies. Higher frequencies above millimeter wavelength frequencies (e.g., terahertz radiation band between infrared light and millimeter wavelength RF), with a dependence on the ability to convert the beat frequency of the interfering light beams (Beam m) to an electromagnetic wave (e.g., in the detailed embodiments disclosed herein, would depend on the ability of the photodetector to convert the be beat frequency of Beam m to the appropriate higher frequency and for the antennas 412 to transmit the same). It will be appreciated that while a transmitter array 10 may dynamically change the range of frequencies that may be transmitted, real time alteration of the carrier frequency will be limited by the type of antenna 412 of the antenna array (although, these may be physically replaced with other antennas by a user).

The light beams (114a, 114b) described herein may be visible light or invisible light (e.g., infrared, ultraviolet). Use of other waveguides other than a fiber optics may also be implemented, however widespread availability and ease of use of fiber optics make such waveguides preferable.

Although aspects of embodiments of the present invention has been described, it will be appreciated that the invention may take many forms and is not limited thereto. It will be apparent to those skilled in the art that various substitution, modifications and changes may be made with respect to the disclosed embodiments without departing from the scope and spirit of the invention.

What is claimed is:

1. [A] *An* antenna array transmitter, comprising:

a first a tunable optical paired source configured to generate a first optical beam having a first wavelength, and a second optical beam having a second wavelength, and configured to combine the first optical beam and the second optical beam into a combined orthogonally polarized optical beam comprising the first optical beam polarized along a first axis and the second optical beam polarized along a second axis, perpendicular to the first axis;

M vector modulators, where M is [an integer] *a positive integer greater than one*, each vector modulator having an optical input and an optical signal output, the M vector modulators including a first vector modulator, *the* first vector modulator comprising:

an electro-optical phase modulator having an input to receive the combined orthogonally polarized optical beam, the electro-optical phase modulator configured to phase modulate the combined orthogonally polarized optical beam in response to a first analog electrical signal;

a polarizer configured to receive the phase modulated combined orthogonally polarized optical beam and to project the first optical beam and the second optical beam components of the combined orthogonally polarized optical beam onto the same axis to form a combined linearly polarized optical beam;

an electro-optical amplitude modulator having an input to receive the combined linearly polarized optical beam in response to a second analog electrical signal;

M photodetectors coupled to receive an optical input from a corresponding one of the M vector modulators and output a corresponding electrical signal, the M photodetectors including a first photodetector coupled to receive the amplitude modulated linearly polarized optical beam from the electro-optical amplitude modulator of the first vector modulator; and M antennas each electrically coupled to a respective one of the photodetectors to receive a driving signal corresponding to the electrical signal output by the respective photodetector.

2. The transmitter of claim 1, wherein wherein the M antennas are each directly electrically coupled to the respective one of the photodetectors to receive the electrical signal output by the corresponding photodetector as the driving signal.

3. The transmitter of claim 1, wherein each of the M vector modulators is configured to receive the combined orthogonally polarized optical beam provided by the first a tunable optical paired source.

4. The transmitter of claim 3, wherein each of the M vector modulators comprise corresponding structure of the first vector modulator, including the electro-optical phase modulator, the polarizer and the electro-optical amplitude modulator.

5. The transmitter of claim 1, further comprising:

a plurality of tunable optical paired sources, including the first tunable optical paired source, each of the plurality of tunable optical paired sources configured to generate a corresponding combined orthogonally polarized optical beam to be transmitted to different vector modulators.

6. The transmitter of claim 5, further comprising an oscillator configured to generate an RF reference signal, wherein the plurality of tunable optical paired sources are connected to receive the RF reference signal.

7. The transmitter of claim 6, wherein oscillator is a voltage controlled oscillator, and wherein the RF reference signal output by the oscillator has a frequency that is controlled by a voltage input to the voltage controlled oscillator.

8. The transmitter of claim 1, wherein the tunable optical paired sources comprises an oscillator configured to generate an RF reference signal, wherein a difference of the first wavelength of the first optical beam and the second wavelength of a second optical beam is controlled by the RF reference signal.

9. The transmitter of claim 8, wherein the oscillator is a voltage controlled oscillator, and wherein the RF reference signal output by the oscillator has a frequency that is controlled by a voltage input to the voltage controlled oscillator.

10. The transmitter of claim 8, wherein frequencies of electromagnetic waves output by the M antennas are responsive to the RF reference signal.

11. The transmitter of claim 8, wherein the RF signal has a first frequency, and wherein the amplitude modulated linearly polarized optical beam output by the electro-optical amplitude modulator of the first vector modulator has a beat frequency that is substantially the same as the first frequency of the RF signal.

12. The transmitter of claim 8, wherein the RF signal has a first frequency, and wherein the amplitude modulated linearly polarized optical beam output by the electro-optical amplitude modulator of the first vector modulator has a beat frequency equal to the first frequency of the RF signal offset by the frequency of at least one of the first analog electrical signal and the second analog electrical signal.

13. The transmitter of claim 1, further comprising:

a digital encoder configured to receive N streams of data symbols and a channel state matrix comprised of a plurality of columns of channel state complex vectors, the digital encoder configured to output M pairs of digital values as a function of the data symbols and the channel state matrix; and M pairs of digital to analog converters configured to generate M analog electrical signal pairs by performing an digital to analog conversion on corresponding ones of M pairs of digital values or corresponding ones of second pairs of digital values derived from the M pairs of digital values.

14. The transmitter of claim 13, wherein each of the M vector modulators comprise a pair of inputs connected to receive a corresponding one of the M analog electrical signal pairs.

15. The transmitter of claim 13, wherein the digital encoder further comprises M pairs of modulators to upconvert corresponding pairs of the M analog electrical signal pairs to provide M upconverted electrical signal pairs, and wherein each of the M vector modulators comprise a pair of inputs connected to receive a corresponding one of the M upconverted analog electrical signal pairs.

16. The transmitter of claim 13, wherein each of the channel state complex vectors corresponds to an RF beam output by the M antennas, each RF beam forming a communication channel to transmit information to at least one location where the corresponding RF beam converges.

17. A method of transmitting information, comprising:

generating M combined orthogonally polarized optical beams, where M is [an integer] *a positive integer greater than one* and the M combined orthogonally polarized optical beams comprise a first optical beam polarized along a first axis and a second optical beam polarized along a second axis, perpendicular to the first axis, the first optical beam having a first wavelength and the second optical beam having a second optical beam perpendicular to the first optical beam;

phase modulating each of the M combined orthogonally polarized optical beams;

converting each of the M phase modulated combined orthogonally polarized optical beams to corresponding M linearly polarized optical beams [by] *including* projecting the first optical beam and the second optical beam components of each of the phase modulated combined orthogonally polarized optical beams onto a corresponding same axis;

[amplitude modulating each of the M linearly polarized optical beams;]

driving M photodetectors with a corresponding one of the [amplitude modulated] *M* linearly polarized optical beams;

driving M antennas with a corresponding electrical output of a corresponding one of the M photodetectors.

*18. The method of claim 17, wherein the M linearly polarized optical beams are amplitude modulated linearly polarized optical beams.*

* * * * *